United States Patent Office 3,070,432
Patented Dec. 25, 1962

3,070,432
COMPOSITIONS FOR VEGETATIVE
PROPAGATION OF PLANTS
Frank M. Strong, Folke Skoog, and Carlos O. Miller, Madison, Wis., assignors to Wisconsin Alumni Research Foundation, Madison, Wis., a corporation of Wisconsin
No Drawing. Filed Aug. 26, 1955, Ser. No. 530,895
5 Claims. (Cl. 71—2.5)

The present invention relates to compositions of matter and in particular compositions having utility in the vegetative propagation of plants. The compositions of the present invention, for example, can be employed for the chemical induction of bud formation in various tissues of plant organs as well as for stimulating or increasing root growth.

The compositions comprise as essential ingredients certain 6-substituted purine compounds described below in combination with at least one of the following (a) an amino purine compound such as adenine and/or (b) an auxin such as indole-3-acetic acid. The amino purine compound is employed in combination with the 6-substituted purine to induce bud formation and the auxin to stimulate or increase root growth.

The 6-substituted purines comprise a purine radical with a —NHR substituent at the 6-position, where R is a lower alkyl group and preferably an alkyl group containing 4–10 carbon atoms, an aralkyl group or an aryl group. Compounds where R is methyl, ethyl, n-butyl, n-decyl and phenyl including chlorophenyl are described in Hitchings et al. Patent 2,691,654. See also Hitchings et al., J. Am. Chem. Soc. 74, 411 (1952). Additional examples of 6-substituted purines for use in the compositions of the present invention are as follows:

EXAMPLE I
6-n-Hexylaminopurine

This product is prepared in accordance with Hitchings et al., supra, by heating a mixture of 6-methylmercaptopurine and hexylamine at about 134° C. for 9 hours. After recrystallization from 60% aqueous alcohol the desired product has a melting point of 178–179° C. In a similar manner other 6-alkylaminopurines can be readily prepared by reacting the appropriate alkylamine with 6-methylmercaptopurine. Examples are the use of isoamylamine, cyclohexylamine and octylamine to produce, respectively, 6-isoamylaminopurine, 6-cyclohexylaminopurine and 6-octylaminopurine.

EXAMPLE II
6-Benzylaminopurine

This product is prepared in accordance with Example I by heating 6-methylmercaptopurine with benzylamine at about 145–147° C. for 8 hours. After recrystallization from absolute ethanol the desired product melts at 229.5–230.5° C. Other aralkyl products can be prepared by reacting the appropriate aralkylamine e,g, phenylethylamine, with the mercaptopurine.

Equivalent type compounds falling within the scope of the invention may be further substituted by replacing the H atom of the —NHR group with a substituent. See Hitchings et al. patent, supra. It is essential, however, that at least one hydrogen atom of the amino group be replaced by a substituent of the type noted above.

The aminopurine compounds suitable for use in the present invention are of the type disclosed in Patent 2,653,087. These include adenine including its salts such as the sulfate salt, guanine, adenylic acid, etc. The auxins suitable for use in the present invention include indoleacetic acids, indolebutyric acids, indolecinnamic acid, naphthalene acetic acid, phenoxyacetic acid including the chloro-derivatives e.g. "2-4-D," etc.

The compositions of the present invention can be employed to advantage, as indicated above, to induce bud formation and root growth. The amount of 6-substituted purine required is relatively small, running in concentrations of about 10–1000γ per liter. Smaller amounts than 10γ/liter give less buds and larger amounts than 1000γ/liter are generally not accompanied by any substantial increase in buds and may cause inhibition of growth. The amount of aminopurine required can vary from about 1–100 mg. per liter with about 20–80 mg. per liter being preferred. The use of less than 1 mg./liter gives relatively little effect and the use of over 100 mg./liter is generally avoided due to toxic side effects. The auxin should be employed in relatively small amounts e.g. 0.1–5.0 mg. per liter as excessive amounts of auxin e.g. over 5 mg./liter, tends to give little additional root growth and at the same time retards bud formation. The compositions of the present invention can be mixed with any type of agricultural chemical carrier including water, emulsions, dusts, etc. Concentrates can be readily prepared for dilution before application to the plants or soil in which the plants are or are to be grown, to seeds, etc.

The following table gives illustrative results using 17–28 tobacco stem segments with 17 day old cultures in water.

TABLE I

| Chemical | Percent segments budding | Average number of buds per segment |
|---|---|---|
| None | 8 | 0.1 |
| Adenine (50 mg./liter) | 100 | 4.2 |
| Adenine (50 mg./liter)+6-benzylaminopurine (1,000 γ/liter) | 100 | 8.5 |
| Adenine (50 mg./liter)+6-hexylaminopurine (1,000 γ/liter) | 100 | 8.6 |

These data, which are representative, show that about a 100% increase in bud formation is obtainable when the 6-substituted purine-adenine combination is used compared to the use of adenine alone. Similar results are obtained for root growth when small amounts of auxin are added to the 6-substituted purine with or without the amino purine compound.

The following table gives illustrative results using tobacco stem callus with 19 day old cultures in an aqueous modified White growth nutrient medium containing 2 mg./liter of indoleacetic acid and various amounts of 6-anilinopurine.

TABLE II

| | Average wet final fresh weight (gr.) | Average dry weight (gr.) |
|---|---|---|
| Control | 1.11 | 0.07 |
| 6-anilinopurine (20 γ/liter) | 2.24 | 0.17 |
| 6-anilinopurine (200 γ/liter) | 2.1 | 0 12 |
| 6-anilinopurine (1,000 γ/liter) | 2.04 | 0.13 |

Compositions containing as low as 1 part per billion (p.p.b.) of the 6-substituted purine compounds in combination with 1000 p.p.b. of the amino purine compounds or 20 p.p.b. of the auxins will increase growth. However, as noted above the use of 10–1000 p.p.b. of the 6-substituted purine is preferred, with 10–100 p.p.b. being recommended for most rootings and 500–1000 p.p.b. being recommended for most buddings. Also, as noted above, the amino purine compound is used in a range of 1000–100,000 p.p.b. with 20,000–80,000 p.p.b. being preferred, and the auxin in a range of 100–5,000 p.p.b. with about 2000 p.p.b. being in the preferred range when using an auxin such as indoleacetic acid (see Example II).

Examples of illustrative compositions are as follows:

(1) Compositions containing 10–1000 p.p.b. of 6-n-hexylaminopurine in combination with 1000–100,000 p.p.b. of adenine and/or 100–5000 p.p.b. of indoleacetic acid.

(2) Compositions containing 10–1000 p.p.b. of 6-benzylaminopurine in combination with 1000–100,000 p.p.b. of adenine and/or 100–5000 p.p.b. of indoleacetic acid.

(3) Compositions containing 10–1000 p.p.b. of 6-anilinopurine in combination with 1000–100,000 p.p.b. of adenine and/or 100–5000 p.p.b. of indoleacetic acid.

Soluble phosphates and amino acids including casein hydrolyzate, tyrosine, etc. can also be incorporated in the compositions of the present invention. Compositions of the type disclosed above containing 10–40 mg./liter of $KH_2PO_4$ and about 0.3% casein hydrolyzate or 200 mg./liter of tyrosine are illustrative. Other nutrients can be added where desired.

We claim:

1. A composition adaptable for use in the chemical induction of bud formation of plants comprising essentially and in sufficient amounts to induce bud formation, a 6-R-aminopurine in combination with a purine characterized by an amino group, where R is selected from the group consisting of lower alkyl, benzyl and phenyl groups.

2. A composition in accordance with claim 1, where the composition consists of a minor amount of the 6-substituted aminopurine, and the purine, characterized by an amino group, consists of a major amount of adenine.

3. A composition adaptable for use in the chemical induction of bud formation of plants containing 10–1000 p.p.b. of 6-n-hexylaminopurine and 1000–100,000 p.p.b. of adenine.

4. A composition adaptable for use in the chemical induction of bud formation of plants containing 10–1000 p.p.b. of 6-benzylaminopurine and 1000–100,000 p.p.b. of adenine.

5. A composition adaptable for use in the chemical induction of bud formation of plants containing 10–1000 p.p.b. of 6-anilinopurine and 1000–100,000 p.p.b. of adenine.

References Cited in the file of this patent

UNITED STATES PATENTS

| | | |
|---|---|---|
| 2,653,087 | Skoog | Sept. 22, 1953 |
| 2,691,654 | Hitchings et al. | Oct. 12, 1954 |